United States Patent
Hunt et al.

(10) Patent No.: US 11,031,140 B2
(45) Date of Patent: Jun. 8, 2021

(54) SYSTEMS AND METHODS FOR MAINTAINING COVER GAS IN NUCLEAR REACTORS

(71) Applicant: GE-Hitachi Nuclear Energy Americas LLC, Wilmington, NC (US)

(72) Inventors: Brian S. Hunt, Wilmington, NC (US); Derek Bass, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 618 days.

(21) Appl. No.: 15/827,881

(22) Filed: Nov. 30, 2017

(65) Prior Publication Data
US 2019/0164653 A1 May 30, 2019

(51) Int. Cl.
*G21C 19/18* (2006.01)
*G21C 1/02* (2006.01)
(Continued)

(52) U.S. Cl.
CPC .............. *G21C 1/028* (2013.01); *G21C 3/02* (2013.01); *G21C 7/32* (2013.01); *G21C 15/18* (2013.01);
(Continued)

(58) Field of Classification Search
CPC ........ G21C 1/028; G21C 19/00; G21C 19/18; G21C 19/19; G21C 19/20; E21B 33/06; E21B 33/10; E21B 33/12
See application file for complete search history.

(56) References Cited

U.S. PATENT DOCUMENTS

| | | | | |
|---|---|---|---|---|
| 3,885,629 A | * | 5/1975 | Erb | E21B 35/00 166/302 |
| 4,002,529 A | * | 1/1977 | Andrea | G21C 19/08 376/271 |

(Continued)

FOREIGN PATENT DOCUMENTS

JP 2011192462 A * 9/2011

OTHER PUBLICATIONS

Cahalan, J., et al. Advanced Burner Reactor 1000MWth Reference Concept. No. ANL-AFCI-202. Argonne National Lab.(ANL), Argonne, IL (United States), 2007. Relevant excerpts attached. Full document available: https://publications.anl.gov/anlpubs/2017/04/134264.pdf.*

(Continued)

*Primary Examiner* — Lily C Garner
(74) *Attorney, Agent, or Firm* — Ryan Alley IP

(57) ABSTRACT

Cover gas control systems include a reservoir and injection path for direct injection into fuel transfer machinery. If seals in the fuel handling machinery leak, cover gas is provided from the reservoir to flow to the leak without contamination from a reactor to which the fuel transfer machinery is joined. This providing cover gas may be passive or automatic in response to a detected low pressure level, detected ambient air ingress, low volume level of cover gas, or manually actuated through an operator. The cover gas may be injected from below the leak but above the reactor. A limitation in the injection path keeps cover gas injection at rates sufficient to allow operator reaction and sealing before the reservoir is depleted. A pressure pulse transmitter, blowout preventer, and transfer port plug are useable in the systems, which can be implemented in fuel handling machinery for reactors using a cover gas.

20 Claims, 3 Drawing Sheets

(51) Int. Cl.
  *G21C 15/18* (2006.01)
  *G21C 7/32* (2006.01)
  *G21C 3/02* (2006.01)
  *G21C 19/28* (2006.01)
  *E21B 33/10* (2006.01)
  *G21C 19/20* (2006.01)
  *G21C 19/19* (2006.01)
  *G21C 19/00* (2006.01)
  *E21B 33/06* (2006.01)
  *E21B 33/12* (2006.01)

(52) U.S. Cl.
  CPC .............. *G21C 19/18* (2013.01); *G21C 19/28* (2013.01); *E21B 33/06* (2013.01); *E21B 33/10* (2013.01); *E21B 33/12* (2013.01); *G21C 19/00* (2013.01); *G21C 19/19* (2013.01); *G21C 19/20* (2013.01)

(56) References Cited

U.S. PATENT DOCUMENTS

| | | | |
|---|---|---|---|
| 4,064,000 A | | 12/1977 | Andrea |
| 4,293,382 A | * | 10/1981 | Ohsumi ................ G21C 19/28 376/308 |
| 4,330,370 A | | 5/1982 | Kazan et al. |
| 4,401,619 A | | 8/1983 | McEdwards |
| 4,495,143 A | | 1/1985 | Gross et al. |
| 5,213,755 A | * | 5/1993 | Kelly ..................... G21C 7/32 376/210 |
| 9,773,574 B2 | | 9/2017 | Peterson |
| 2015/0228363 A1 | | 8/2015 | Dewan et al. |

OTHER PUBLICATIONS

Boyd, C. L., F. H. Shadel, and J. H. Westsik. Fast Flux Test Facility Reference Concept. Progress Report. No. BNWL-470. Battelle-Northwest, Richland, Wash. Pacific Northwest Lab., 1967. Relevant excerpts attached. Full document available at: https://www.osti.gov/biblio/4559620.*

Cahalan, J. E., and T. A. Taiwo. Liquid salt-very high temperature reactor: survey of sodium-cooled fast reactor fuel handling systems for relevant design and operating characteristics. No. ANL-GENIV-069. Argonne National Lab.(ANL), Argonne, IL (United States), 2006.*

Forsberg, C. W., et al. "Refueling Options and Considerations for Liquid-Salt-Cooled Very High-Temperature Reactors." ORNL/TM-2006/92, Oak Ridge National Laboratory, Oak Ridge, TN 2996 (2006).*

Specialists' Meeting on Fast Reactor Cover Gas Purification. Richland, Washington. Sep. 24-26, 1986. First page attached. Full document available: inis.iaea.org/collection/NCLCollectionStore/_Public/33/011/33011380.pdf?r=1&r=1.*

Triplett, Brian S., Eric P. Loewen, and Brett J. Dooies. "PRISM: a competitive small modular sodium-cooled reactor." Nuclear technology 178.2 (2012): 186-200.*

Allen, K. J., G. E. Meadows, and W. J. Schuck. Liquid metal reactor cover gas purification and analysis in the USA. No. IWGFR-61. Westinghouse Hanford Company, 1987.*

\* cited by examiner

SYSTEMS AND METHODS FOR MAINTAINING COVER GAS IN NUCLEAR REACTORS

BACKGROUND

FIG. 1 is a schematic of a related art molten salt or liquid metal reactor 1 being serviced by a refueling machine 10. For example, reactor 1 may include a core cooled by molten salt or liquid metal, such as sodium, as liquid coolant 4 for fast and/or thermal spectrum nuclear fission to produce heat for electricity generation or process heat when in operation. A cover gas, such as an inert gas, may be maintained above liquid coolant 4 to prevent reaction and contamination in liquid coolant 4. Liquid sodium and similar coolants may have significantly exothermic reactions with normal air, and liquid lead and salts may form corrosive or inhibiting contaminants when exposed to air. During operation cover gas may be continuously or batch-wise cycle purified from discharge or suction valve 2 and returned via makeup valve 3, allowing injection of additional gas or filtered, cleaned gas during operation.

As shown in FIG. 1, during an outage, reactor 1 may be joined to a refueling machine 10 for exchange, replacement, and/or other modification of nuclear fuel in the core. During times of access to reactor 1, such as during refueling maintenance, a flange or other opening in reactor 1 connects to fuel transfer port 12 for movement of fuel 5 in fuel transfer cask 11. Interface 6 between port 12 and fuel transfer cask 11 and any fuel handling machinery may be sealed by valves 13 between cask 11 and port 12. Valves 13 may largely prevent cover gas from exiting refueling machine 10 from reactor 1; during fuel operations, valves 13 may be coupled together at interface 6 and unsealed to enable extension of fuel and machinery through interface 6 for refueling operations. In the event of leak 20, cover gas injection or makeup valve 3 may provide additional cover gas into a top of reactor 1. Valve 3 is conventionally actuated using electrical or mechanical power in response to an operator command in response to leak 20.

SUMMARY

Example embodiments include cover gas control systems useable with nuclear reactors having heat transfer fluids that are sensitive to environmental oxygen, water vapor, and other external contaminants and reactants. When fuel transfer machinery is connected to the open reactor, fuel handling tools may be passed into the reactor through the machinery, and cover gas, such as nitrogen, argon, or another inert gas, may freely flow between the reactor and machinery. Example embodiments provide a cover gas reservoir and injection path for the gas to be provided into the machinery, as opposed to directly into the reactor away from the machinery. For example, if seals in the fuel handling machinery leak, such as due to pressure or tool interaction, cover gas may be provided from the reservoir to flow to the leak with very little or no contamination from the reactor heat transfer fluid or existing contaminated cover gas. If the injection path is at a lower vertical point in the machinery but above the reactor, injected gas may only flow upward, preventing circulation in the reactor and downward ambient air flow from the leak. The injection path may be limited with a valve and/or restrictive inner diameter to keep cover gas injection at a slow, controlled rate and only in response to needed makeup. For example, a fluidic control, such as a pressure pulse transmitter, can open and close the injection path based on a detected pressure below a normal cover gas pressure that indicates a need for cover gas makeup.

Example embodiments may also use a blowout preventer to permanently seal an end of the machinery before the leak, such that all cover gas from the reservoir is not lost. A reactor plug that allows only cover gas bypass may also be used in the reactor to thermally seal the same at necessary junctures. Through example embodiments and method of operating the same, separate cover gas injection systems directly joined to the reactor do not have to be installed or used.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
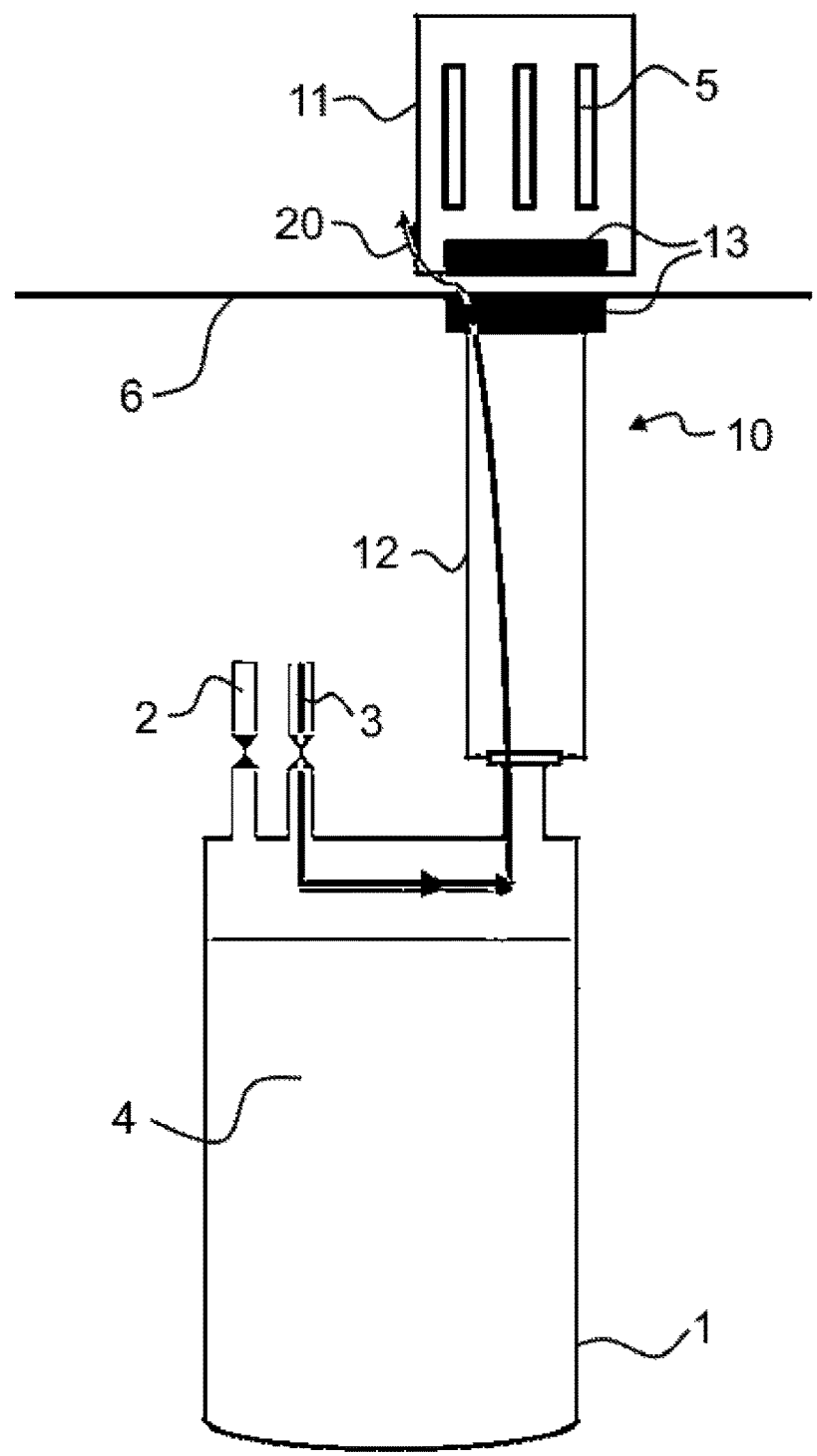
FIG. 1 is a schematic of a related art nuclear power vessel with refueling machinery.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that related art cover gas makeup systems for use during operation or shutdown allow cover gas to flow over liquid coolant to a leak between seals in fuel handling structures, such as leakage 20 shown in FIG. 1 passing over liquid coolant 4. The cover gas is thus more likely to contain radioactive particulates or activation due to direct exposure to and flow over the liquid coolant. The inventors have further recognized that complete or significant seal or valve failure is possible during fuel manipulation, such as when fuel manipulation arm 15 (FIG. 2) or other equipment extends down into reactor 1 from casks 11, blocking seals 13 from closing. Typical cover gas makeup systems require manual operation and electrical- or air-powered valves, which the Inventors have recognized require significant effort for proper actuation. In such an incident, the cover gas may uncontrollably flow out of the failure point, causing contamination or exposure.

Further, the Inventors have recognized that lower cover gas may heat up from proximity to reactor 1 and liquid coolant 4 and rise through the higher, cooler cover gas under natural convection. If seal 13 ruptures, the rising cover gas may allow outside air to partially enter through leak 20. Over time this may enhance replacement of the cover gas with outside air in a continuous cycle. Such outside air may be cycled over liquid coolant 4 if related art cover gas makeup systems are used, resulting in a risk of reaction between the liquid coolant and oxygenated/humid air. To overcome these newly-recognized problems as well as others, the inventors have developed example embodiments and methods described below to address these and other problems recognized by the inventors with unique solutions enabled by example embodiments.

The present invention is cover gas control systems useable in nuclear reactor fuel handling systems. In contrast to the present invention, the few example embodiments and example methods discussed below illustrate just a subset of the variety of different configurations that can be used as and/or in connection with the present invention.

Figure 2:
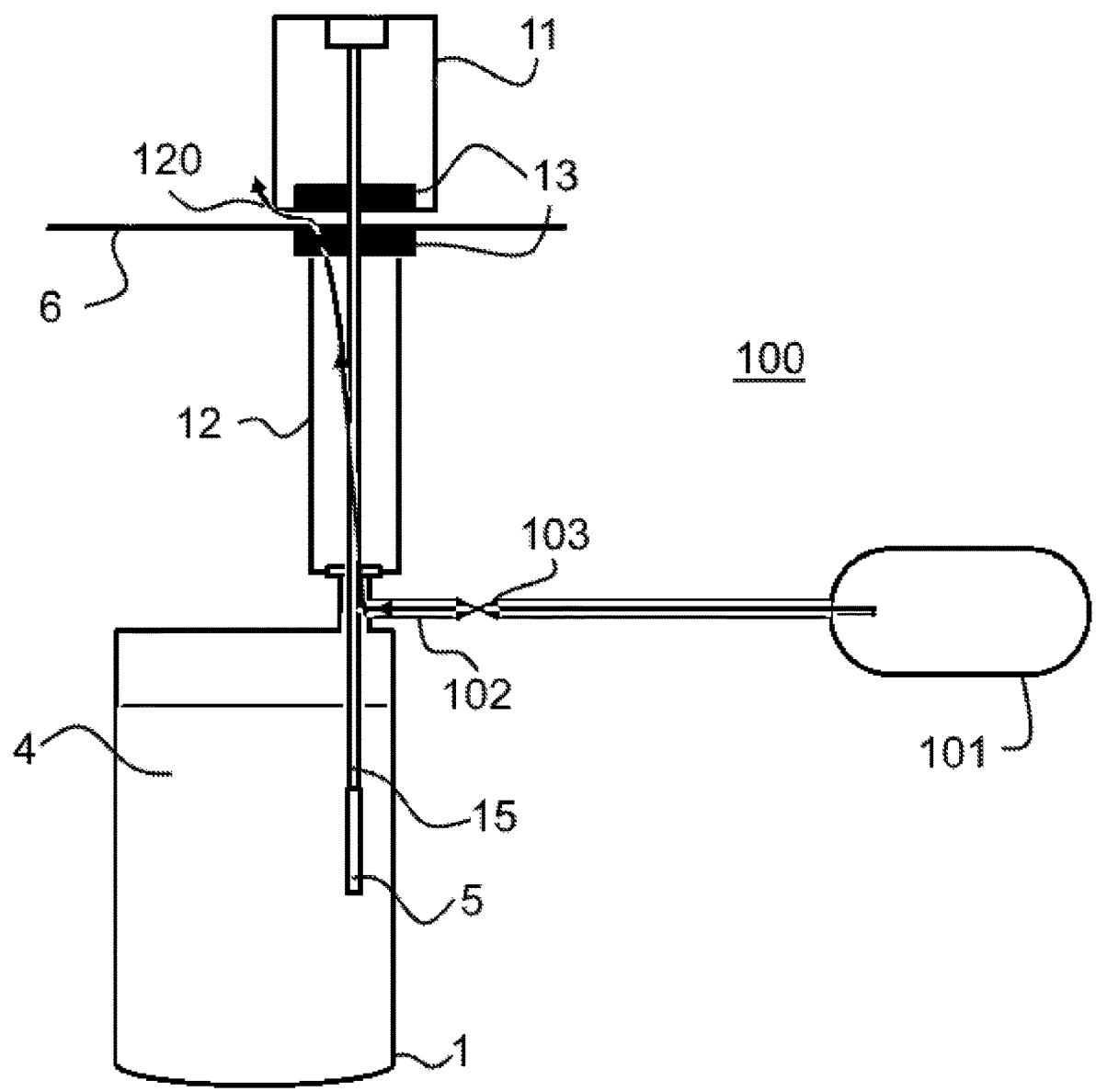
FIG. 2 is a schematic illustration of an example embodiment cover gas management system.

FIG. 2 is a schematic of an example embodiment cover gas makeup system 100 in use with a molten salt or liquid metal reactor 1. Although the example of FIG. 2 is shown in combination with a related art reactor 1, it is understood that any reactor using a cover gas is useable with example embodiments. As shown in FIG. 2, cover gas makeup system 100 includes a gas makeup source 101, such as a pressurized tank of cover gas. The gas in source 101 may match that used as a cover gas over liquid coolant 4 during operation, including argon, nitrogen, etc.

Source 101 is joined above reactor 1 by an injection pathway 102, which may be rigid piping or flexible tubing for example, to carry gas from source 101 into reactor 1. Injection pathway 102 joins to reactor 1 through fuel transfer port 12, which is shown in FIG. 2 with fuel handling equipment like fuel manipulation arm 15 extending throughout as would be common during fuel movement activities. The junction of injection pathway 102 above reactor 1 at fuel transfer port 12 ensures that gas injected from source 101 will tend to flow directly from injection pathway 102 to a leakage point 120 in the event of seals or valves 13 leaking. In this way, cover gas added from source 101 may not pass over a large portion of liquid coolant 4 and may thus have less radioactive contamination and activation. Moreover, by maintaining a penetration for cover gas makeup in fuel handling equipment, injection pathway may not require any additional penetration into or modification of reactor 1; a conventional fuel handling connection may be used with example embodiments without increasing risk to reactor vessel integrity.

Injection valve 103 on injection pathway 102 may control the rate of injection from source 101 into reactor 1 and port 12. Isolation valve 103 may be a one-way valve that is actuated manually or through operator intervention in a control room or refueling platform. Injection pathway 102 may also be sized, or include a flow limiter, to restrict a maximum flow rate from source 101 into port 12 and/or reactor 1. For example, injection pathway 102 may include a choke plate, inner diameter, or other orifice to substantially slow gas flow from source 101 and prevent complete emptying into port 12 even under an extreme but temporary pressure differential. For example, if injection pathway 102 has a small enough inner diameter to prevent source 101 from completely discharging for 5 minutes even when venting to atmospheric pressure, this substantially slowed flow rate may prevent rapid fluctuations in cover gas volume and pressure in reactor 1 and associated refueling structures, while also permitting operators to have some time to react to a large leak or loss of cover gas before source 101 is fully depleted.

In operation, valves 13 may leak cover gas due to a pressure differential and movement of fuel handling structures like arm 15. Or another condition may require cover gas replenishment within reactor 1 or the fuel handling structures, including fuel transfer port 12 or fuel transfer cask 11. Isolation valve 103 may be actuated in such an instance, allowing cover gas from source 101 to be driven into fuel transfer port 12, such as through a pressure differential, for example. Reactor 1 may not include, or have actuated, any other suction valve 2 (FIG. 1), such that gas will generally flow along escape path 120. Cover gas is thus made up in fuel transfer port 12, generally following path 120 to any potential escape, without accumulating radiation from contact or prolonged exposure to liquid coolant 4.

By maintaining full cover gas volume above the liquid coolant 4 in fuel transfer port 12, and in any other connected space, outside air may not ingress to reactor 1 from outside connections or through leaks. This may prevent or reduce ambient air reaction with liquid coolant 4 or another heat transfer medium as well as prevent or reduce contamination to the same. Especially if the cover gas is denser than ambient air, such as in the case of argon, positioning of injection pathway 102 at a top of reactor 1 in fuel transfer port 12 may ensure any less dense ambient air is unable to reach liquid coolant 4, because it cannot move downward through the cover gas being provided from injection pathway 102 below a leak in valves 13.

Figure 3:
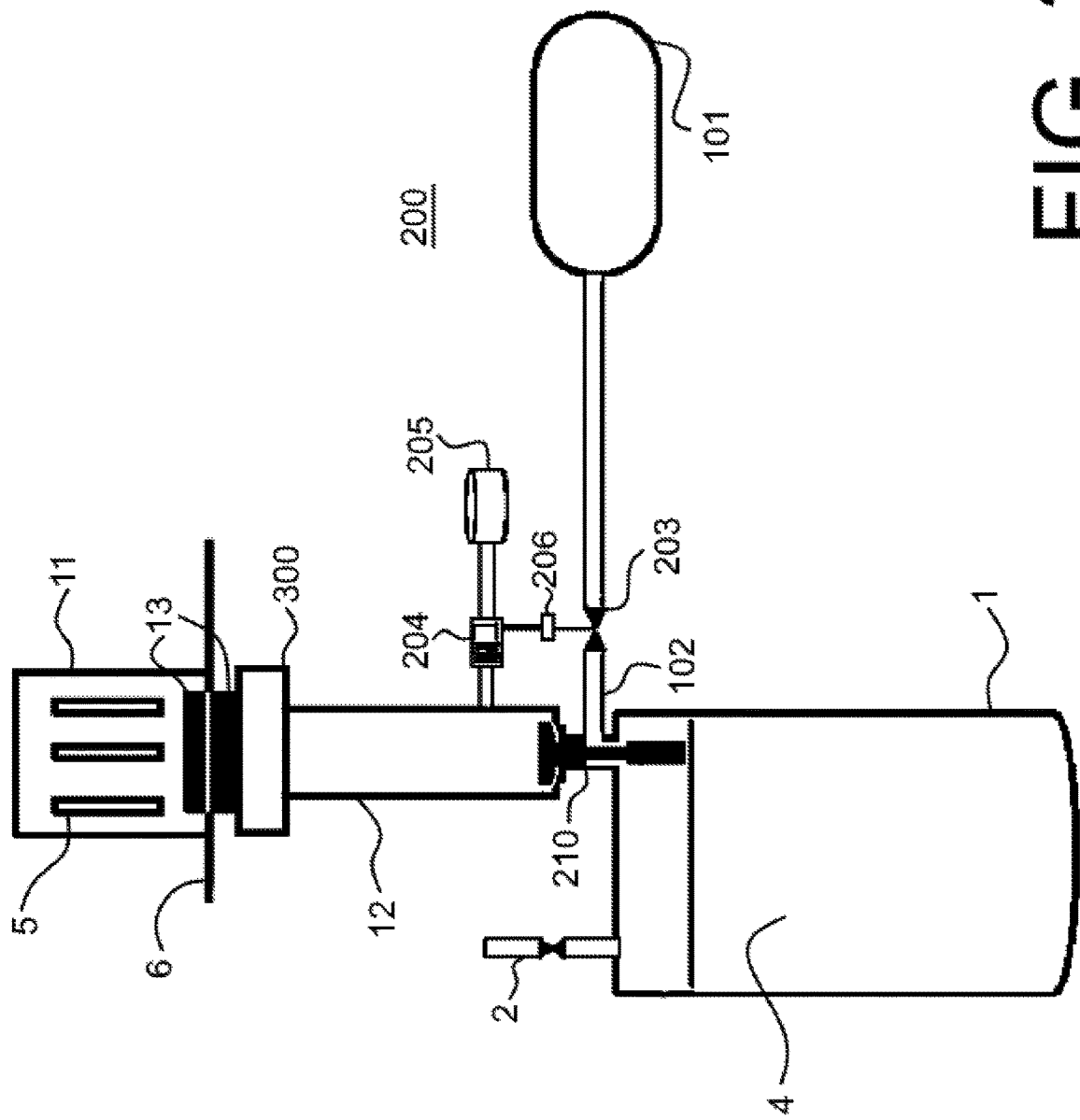
FIG. 3 is a schematic illustration of another example embodiment cover gas management system.

FIG. 3 is an illustration of another example embodiment cover gas makeup system 200 showing additional features. For example, as seen in FIG. 3, there may be a passively-activated valve 203 on injection pathway 102 that automatically injects cover gas when a low level by pressure, is detected by a fluidic control. For example, pressure pulse transmitter 204 can be paired with pilot valve 206 and pressurized fluid 205 to actuate valve 203 in response to very small pressure changes of cover gas in port 12. Pressure pulse transmitter 204 includes a valve having a biased piston balanced between an open plenum that is slightly pressurized sufficient to open pilot valve 206. The biasing force, provided by example through a spring, is such that in combination with pressure from cover gas in fuel transfer port 12 is slightly greater force than the pressure of pressurized fluid 205. When the pressure of fuel transfer port 12 is relieved via rupture or break or leak, the pressure of pressurized fluid 205 is able to move the piston, exposing a flow path between pressurized fluid 205 and pilot valve 206. This pressurized gas or fluid 205 then operates pilot valve 206 when this flow path is opened. Thus, pressurized fluid 205 may be transmitted at high pressure to pilot valve 206 by transmitter 204 in response to a cover gas pressure drop, driving open passively-activated valve 203. Pilot valve 206 may then close passively-activated valve 203 when pressure stabilizes or returns to a threshold level. Of course, other passive devices, such as a digital pressure gauge paired with a self-powered valve can be used for passively activated valve 203 to achieve automatic cover gas refilling and maintenance of even pressure of the cover gas in the instance of leakage.

As further seen in FIG. 3, fuel transfer port plug 210 may be used at a connection point of port 12 with reactor 1 to seal reactor 1 while allowing some cover gas injection. In this way, no separate cover gas injection penetration or makeup valve 3 (FIG. 1) in a reactor top plate is needed. Fuel transfer port plug 210 may provide thermal shielding, radiation shielding, and material sealing to reactor 1 while fuel movement is not being performed, such as during normal power operation. Plug 210 includes flow passages, potentially in the form of open notches for two-way flow or one-way flow, that permits injection gas to move from injection pathway 102 into reactor 1. In this way, even with fuel transfer port plug 210 plug installed, cover gas may still be provided to, and maintained at desired pressure in, reactor 1 by example embodiment cover gas makeup system 200.

As further seen in FIG. 3, blowout preventer 300 may be installed in series with or replace valves 13, potentially at a top of fuel transfer port 12. Blowout preventer 300 may act as a final measure to preserve cover gas isolation to liquid coolant 4 in the case of a major leak or failure of valves 13 and/or fuel transfer cask 11. Blowout preventer 300 may take on known designs from oil and gas applications and have sufficient closing power to isolate refueling systems below valves 13. Blowout preventer may be integrated into valves 13 and/or placed at other locations in fuel handling structures where emergency isolation may be desired. Blowout preventer 300 may even be configured with sufficient choking or closing force to sever fuel handling equipment extending into fuel transfer port 12 in the instance that a final-measure seal is needed.

Blowout preventer 300 may be manually actuated or automatically set to close upon detection of a large leak through loss of pressure and/or near-depletion of cover gas source 101. For example, a self-powered actuator may be paired with a pressure or level gauge on source 101, an ambient air detector in fuel transfer port 12, or a pressure pulse transmitter on source 101 or port 12 may all permit automated or passive actuation of blowout preventer at thresholds or conditions associated with catastrophic or irreparable loss of cover gas or system integrity. For example, when a pressure threshold, such as pressure near atmosphere, indicating near-depletion of source 101 is reached, the low pressure may activate a control system, pressure pulse transmitter, or other passive activation of blowout preventer 300. Cover gas source 101 may provide remaining cover gas into port 12 and reactor 1 even after actuation of blowout preventer 300, ensuring that even a sealed-off reactor and transfer port retain cover gas following a significant accident or leak. Suction valve 2 may be used to cycle or drain cover gas in this instance.

Example embodiments and methods thus being described, it will be appreciated by one skilled in the art that example embodiments may be varied and substituted through routine experimentation while still falling within the scope of the following claims. For example, a variety of different heat transfer media and reactor types are compatible with example embodiments and methods simply through proper operation and cover gas selection in example embodiments—and fall within the scope of the claims. Such variations are not to be regarded as departure from the scope of these claims.

What is claimed is:

1. A nuclear reactor refueling system configured to provide cover gas to an ambient-air-sensitive heat transfer fluid in a nuclear reactor, the system comprising:
   a fuel transfer cask configured to hold nuclear fuel outside the nuclear reactor;
   a fuel transfer port joined to the fuel transfer cask and configured to connect to the nuclear reactor to move fuel between the cask and the reactor;
   a cover gas source; and
   an injection pathway connected directly between the cover gas source and the fuel transfer port, wherein the injection pathway connects to the fuel transfer port vertically below the fuel transfer cask and vertically above where the fuel transfer port is configured to connect to the nuclear reactor.

2. The system of claim 1, further comprising:
   a sealing valve joining the fuel transfer port and the fuel transfer cask, wherein the injection pathway connects to the fuel transfer port vertically below the sealing valve such that cover gas flows up from the injection pathway to the sealing valve when there is a leak in the sealing valve.

3. The system of claim 1, wherein the cover gas source is a pressurized tank of argon, and wherein the injection pathway includes,
   a control valve opening and closing the injection pathway, and
   a flow limiter to substantially slow flow of cover gas out of the tank.

4. The system of claim 1, further comprising:
   a fluidic control joined to the fuel transfer port and configured to close the injection pathway based on a cover gas pressure in the fuel transfer port.

5. The system of claim 1, further comprising:
a blowout preventer on the fuel transfer port, wherein the blowout preventer is configured to permanently seal an end of the fuel transfer port.

6. The system of claim 5, wherein the blowout preventer is configured to seal the end of the fuel transfer port before the cover gas source is exhausted.

7. The system of claim 1, further comprising:
the nuclear reactor, wherein the nuclear reactor includes the ambient-air sensitive heat transfer fluid.

8. The system of claim 7, wherein the nuclear reactor includes a separate cover gas injection valve and suction valve apart from the fuel transfer port.

9. The system of claim 7, wherein the nuclear reactor includes a fuel transfer port plug blocking a connection between the reactor and the fuel transfer port, wherein the fuel transfer port plug is permeable to the cover gas from the injection pathway.

10. The system of claim 7, wherein the nuclear reactor is a fast reactor and wherein the heat-transfer fluid is a molten salt or liquid metal.

11. A nuclear reactor refueling system comprising:
a nuclear reactor including an ambient-air-sensitive heat transfer fluid;
a fuel transfer cask configured to hold nuclear fuel outside the nuclear reactor;
a fuel transfer port joined to the fuel transfer cask and the nuclear reactor to move fuel between the cask and the reactor, wherein the nuclear reactor includes a fuel transfer port plug blocking a connection between the reactor and the fuel transfer port;
a cover gas source; and
an injection pathway connected directly between the cover gas source and the fuel transfer port, wherein the fuel transfer port plug is permeable to the cover gas from the injection pathway.

12. The system of claim 11, further comprising:
a sealing valve joining the fuel transfer port and the fuel transfer cask, wherein the injection pathway is vertically below the sealing valve such that cover gas flows up from the injection pathway to the sealing valve when there is a leak in the sealing valve.

13. The system of claim 11, wherein the cover gas source is a pressurized tank of argon, and wherein the injection pathway includes,
a control valve opening and closing the injection pathway, and
a flow limiter to substantially slow flow of cover gas out of the tank.

14. The system of claim 11, further comprising:
a fluidic control joined to the fuel transfer port and configured to close the injection pathway based on a cover gas pressure in the fuel transfer port.

15. The system of claim 11, further comprising:
a blowout preventer on the fuel transfer port, wherein the blowout preventer is configured to permanently seal an end of the fuel transfer port.

16. The system of claim 15, wherein the blowout preventer is configured to seal the end of the fuel transfer port before the cover gas source is exhausted.

17. The system of claim 11, wherein the nuclear reactor includes a separate cover gas injection valve and suction valve apart from the fuel transfer port.

18. The system of claim 11, wherein the nuclear reactor is a fast reactor and wherein the heat-transfer fluid is a molten salt or liquid metal.

19. A method of providing cover gas over an ambient-air-sensitive heat transfer fluid during refueling of a nuclear reactor, the method comprising:
providing the system of claim 11; and
in response to a leak forming in fuel handling structures in fluid communication with the nuclear reactor, flowing the cover gas directly into the fuel handling structures from a cover gas source.

20. The method of claim 19, wherein the flowing includes flowing the cover gas directly into a bottom of a fuel transfer port above the nuclear reactor, the method further comprising:
detecting the leak forming in the fuel handling structures with a pressure pulse transmitter; and
stopping the flowing the cover gas upon detection of a normal cover gas pressure.

* * * * *